United States Patent
Naik et al.

(10) Patent No.: US 6,510,357 B1
(45) Date of Patent: Jan. 21, 2003

(54) AUTOMATED WELDING PROGRAM FOR FULL BODY-IN-WHITE FINITE ELEMENT ASSEMBLY

(75) Inventors: Ram Naik, Germantown, MD (US); Sudheendra Vasudeva Rao, Rochester Hills, MI (US); Subhas V Shetty, Auburn Hills, MI (US)

(73) Assignee: DaimlerChrysler Corporation, Auburn Hills, MI (US)

( * ) Notice: Subject to any disclaimer, the term of this patent is extended or adjusted under 35 U.S.C. 154(b) by 0 days.

(21) Appl. No.: 09/513,500

(22) Filed: Feb. 25, 2000

(51) Int. Cl.$^7$ .............................................. G06F 19/00
(52) U.S. Cl. ....................................... 700/98; 700/212
(58) Field of Search .............................. 700/98, 95, 96, 700/108, 114, 117, 118, 163, 166, 182, 195, 212; 219/86.23, 86.7, 87; 901/42

(56) References Cited

U.S. PATENT DOCUMENTS

| | | | | |
|---|---|---|---|---|
| 4,256,947 A | * | 3/1981 | De Candia | 219/158 |
| 5,040,124 A | | 9/1991 | Okumura et al. | 700/212 |
| 5,380,978 A | * | 1/1995 | Pryor | 219/121.64 |
| 5,729,463 A | * | 3/1998 | Koenig et al. | 700/98 |
| 5,772,814 A | | 6/1998 | Grewell | 156/64 |
| 5,906,761 A | | 5/1999 | Gilliland et al. | 219/124.34 |
| 5,910,894 A | * | 6/1999 | Pryor | 219/121.64 |
| 6,081,654 A | * | 6/2000 | Morman et al. | 703/1 |
| 6,209,396 B1 | * | 4/2001 | Wortge et al. | 73/657 |
| 6,259,453 B1 | * | 7/2001 | Itoh et al. | 345/423 |
| 6,266,138 B1 | * | 7/2001 | Keshavmurthy | 356/237.2 |
| 6,415,191 B1 | * | 7/2002 | Pryor | 29/12 |

FOREIGN PATENT DOCUMENTS

| | | | |
|---|---|---|---|
| JP | 02001353574 A | * | 12/2001 |

OTHER PUBLICATIONS

Rodger et al., "Parameterized Template Meshes for 2D and 3D Finite Element Modeling", IEEE, vol. 36, No. 4 pp. 1610–1614.*

Lenz et al., "Process Prototyping—Finite Element Modeling of the Laser Welding Process", Institute for Machine Tools and Industrial Management.*

Reinhart et al., "Finite Element Simulation for the Planning of Laser Welding Applications", Proc. of the 18$^{th}$ intern. Congress on Applications of Lasers & Electro–Optics.*

Budgell, "Finite Element Analysis and Optimization Introduction",.*

Frewin et al., "Finite Element Model of Pulsed Laser Welding", Welding Research Supplement.*

Johnson, "Activity Report 970101–971231", Chalmers Flnite Element Center.*

* cited by examiner

Primary Examiner—Leo Picard
Assistant Examiner—Chad Rapp
(74) Attorney, Agent, or Firm—Ralph E. Smith

(57) ABSTRACT

An automated computer modeling system generates a welded finite element model of a vehicle body. The modeling system includes a projection module for projecting predefined weld locations onto a finite element mesh representing surface data for the vehicle body such that a modified finite element mesh is generated. A welding module automatically generates assigned weld elements for the modified finite element mesh by determining the nearest node on each part with respect to the predefined weld locations and welding the parts together. The assigned weld elements and the modified finite element mesh therefore define the welded finite element model of the vehicle body. An executable file is used to perform projection functions as well as welding functions. The projection module incorporates a finite element processor to generate the modified FE mesh. The weld data and the surface data from the FE mesh are organized in a manner that allows the predefined weld locations to be linked with the node locations for each part. Automation of the projection and welding processes results in substantial cost savings due to reduced man-hours.

20 Claims, 5 Drawing Sheets

AUTOMATED WELDING PROGRAM FOR FULL BODY-IN-WHITE FINITE ELEMENT ASSEMBLY

BACKGROUND OF THE INVENTION

1. Field of the Invention

The present invention relates generally to generating welded finite element models. More particularly, the present invention relates to a method and system for automatically projecting predefined weld data onto a finite element mesh and automatically welding the finite element mesh together based on the predefined weld data.

2. Discussion of the Related Art

In the automotive industry, full body vehicle computer simulation models are used to study crash, noise, and vibratory effects on the final design of automotive bodies. Two types of information necessary to generate these computer models are surface information and weld information. Surface information includes information about the shapes and contours of the body parts, while weld information includes information about how the body parts interrelate and connect. Computer tools are available to make use of surface information as well as welding information. For example, commercial finite element processors have been developed to provide helpful visual assistance to scientists and engineers in determining the structural characteristics of vehicles. It is common for these finite element processors to generate a "mesh" of the vehicle body, which is essentially a representation of the vehicle body in terms of fundamental elements. Thus, a given part is divided into a collection of geometrical shapes (triangles and rectangles), with each element defined by a plurality of nodes (or grids). A finite element mesh of a full vehicle body having three hundred parts, for example, will likely have thousands of nodes.

While portraying surface information or parts via computer-based finite element meshes is generally well known in the industry as well as the generation of electronic data representing predefined weld locations, considerable difficulty has remained regarding actually welding the parts together via computer. In fact, the welding process for finite element models has conventionally been a manual one. For example, a finite element processor such as Hypermesh allows the user to manually input predefined weld locations into a pre-existing finite element mesh. The predefined weld locations are typically contained in an electronic weld file, which is created by a commonly available macro such as ZMAWELD. To complete such a task manually has been found to take approximately fifteen hours for 357 welds under the conventional approach. It is therefore desirable to provide a method and system for automating the projection of predefined weld locations onto a given finite element mesh such that processing time is reduced.

Once the predefined weld locations have been projected onto the finite element mesh, the next task is to generate the actual welds. While the predefined weld locations typically identify a grid's XYZ coordinate for a given assembly of parts, generation of the actual weld entails determining the specific node on each part that will be included in the weld. Once again, conventional approaches have required manual selection of each and every node. Thus, it has been approximated that to weld a full vehicle body having 150,000 elements takes around eighty hours. It is therefore highly desirable to provide a method and system for automatically welding a finite element mesh together such that processing time is reduced.

A common occurrence in the creation of finite element models is the mismatch of parts, nodes, and welds. For example, the weld file will often include parts that are not found in the finite element mesh, and vice versa. Similarly, the nodes of a part to be welded may fall outside of a predefined weld tolerance with respect to a predefined weld location. It is therefore desirable to provide error information regarding parts, nodes, and welds to the user, so that inconsistencies can be corrected with minimal effort and processing time.

SUMMARY OF THE INVENTION

The present invention provides a computer-based method for generating a welded finite element model of a vehicle body. The method includes the steps of retrieving weld data for the vehicle body from a weld input source, and automatically projecting the weld data onto a finite element mesh with an executable control file. The finite element mesh represents surface data for the vehicle body, such that the automatic projection of the weld data creates a modified finite element mesh. The method further provides for automatically welding the modified finite element mesh, such that a welded finite element model is generated.

The present invention also provides an automated method for generating an assigned weld element for an assembly of parts in a computer model of a full vehicle body. The executable file determines on each part to be welded, the nearest node with respect to the predefined weld location, and generates a weld connecting the parts at these nodes.

The present invention further provides an automated computer modeling system for generating a welded finite element model of a vehicle body. The modeling system includes a projection module, and a welding module. The projection module projects weld data onto a finite element mesh representing surface data for the vehicle body such that a modified finite element mesh is generated. The welding module automatically generates assigned weld elements for the modified finite element mesh and welds the parts. The assigned weld elements and the modified finite element mesh define the welded finite element model of the vehicle body.

Further objects, features and advantages of the invention will become apparent from a consideration of the following description and the appended claims when taken in connection with the accompanying drawings.

BRIEF DESCRIPTION OF THE DRAWINGS

The present invention will become more fully understood from the detailed description and the accompanying drawings, wherein.

DETAILED DESCRIPTION OF THE PREFERRED EMBODIMENT

Figure 1:
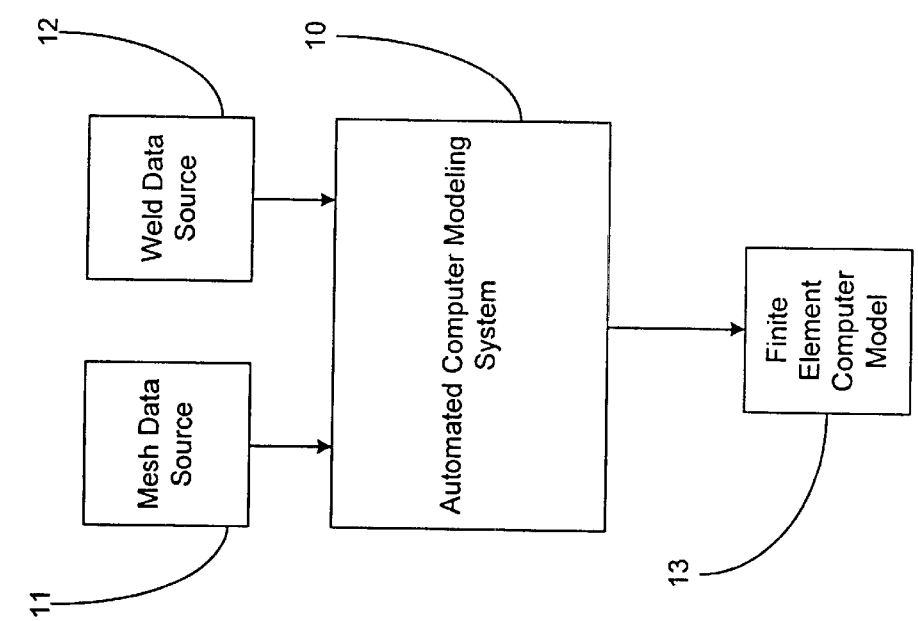
FIG. 1 is a block diagram of an automated computer modeling system in accordance with the present invention.
Figure 6:
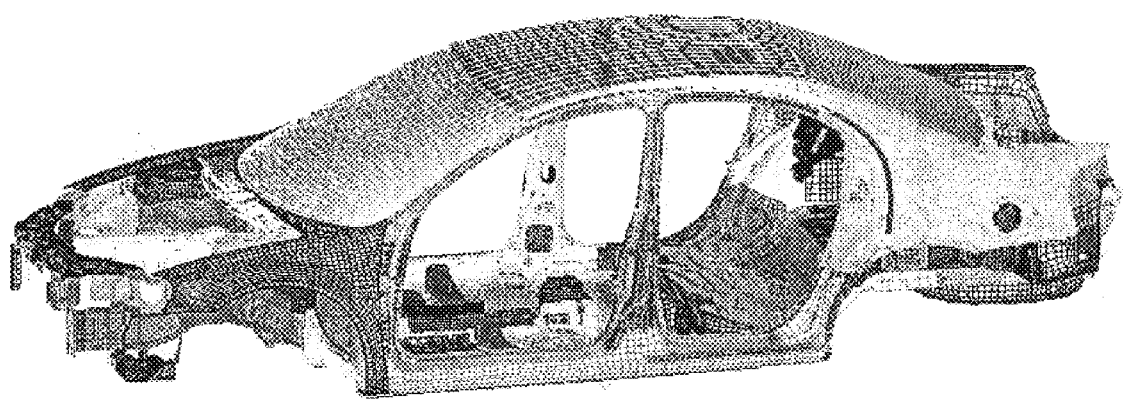
FIG. 6 is an isometric view of a welded finite element model of a full vehicle body.

FIG. 1 is a block diagram of an automated computer modeling system 10 for generating a welded finite element computer model 13 of a vehicle body in accordance with the present invention. Modeling system 10 retrieves a finite element (FE) mesh from a mesh data source 11, and weld data from a weld data source 12. Thus, the modeling system 10 substantially reduces the amount of time required to generate the welded FE computer model 13 by eliminating virtually all manual steps. An exemplary welded FE computer model 13 is shown in FIG. 6.

Figure 2:
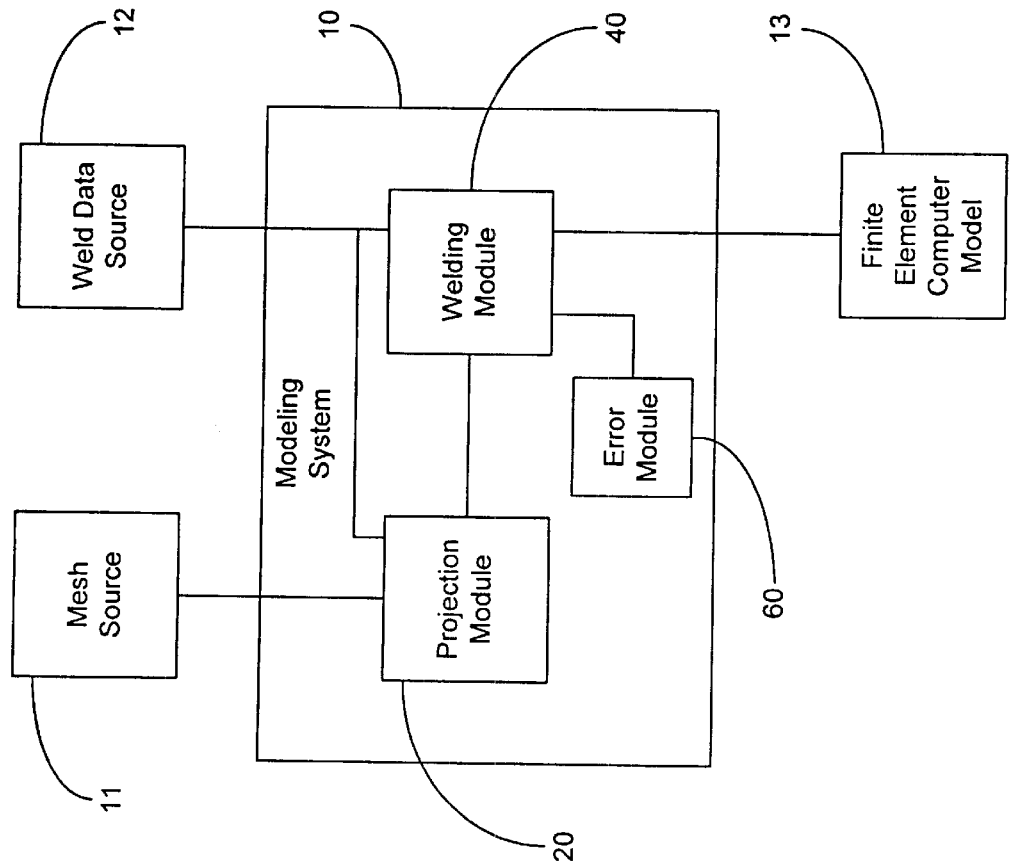
FIG. 2 is a more detailed block diagram of an automated computer modeling system in accordance with a preferred embodiment of the present invention.

Turning now to FIG. 2, the modeling system 10 is shown in greater detail. It will be appreciated that the modeling system 10 can be implemented via a computer readable set of instructions using programming techniques and tools commonly known and readily available in the art. Generally, modeling system 10 includes a projection module 20 for projecting weld data onto a finite element mesh representing surface data for the vehicle body such that a modified finite element mesh is generated. A welding module 40 automatically generates assigned weld elements for the modified finite element mesh and welds the parts together. The assigned weld elements and the modified finite element mesh define the welded FE computer model 13 of the vehicle body. Preferably, the modeling system 10 further includes an error module 60 for collecting error data from the welding module 40. The error data can define missing parts in the modified FE mesh, or weld locations falling outside a predefined weld tolerance. In the case of missing parts, the error data can further define dummy node locations for the missing parts as defined by the welding module 40.

Figure 4:
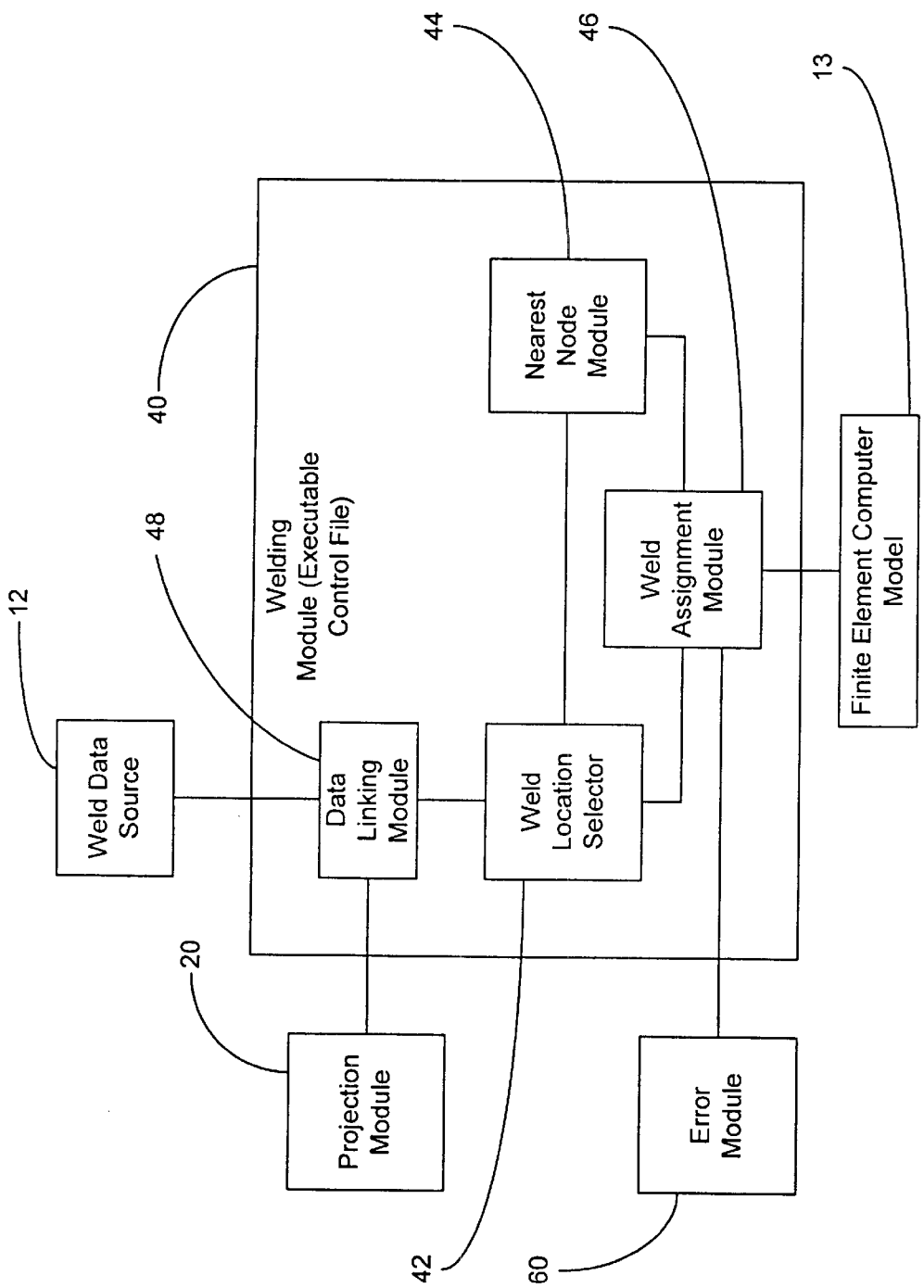
FIG. 4 is a block diagram of a welding module in accordance with the present invention.

The weld data includes predefined weld locations for a plurality of parts assemblies. As shown in FIG. 4, the welding module 40 is implemented via an executable file, and has a weld location selector 42 for identifying the predefined weld location and a nearest node module 44 for identifying nearest nodes. Each part should have a nearest node with respect to the weld location. Selecting the nearest node on each of the parts in the assembly ensures that the resulting weld will be perpendicular to the surfaces of the parts. Perpendicularity improves the quality of the results generated for safety, noise and vibration computer simulations. The welding module 40 further includes a weld assignment module 46 for defining the assigned weld locations based on the nearest node locations. Thus, while the weld data source 12 provides suggested predefined weld locations, the welding module generates welds at the weld locations using the modified FE mesh provided by the projection module 20. As already noted, the modified FE mesh contains node locations for the parts in the vehicle, and it is these node locations that are relied upon in generating the actual welds. It can further be appreciated that the weld assignment module 46 is also capable of generating error data for the error module 60. In a preferred embodiment, a data-linking module 48 generates a weld list and an element list. The weld list includes the predefined weld locations and the element list includes node locations for the parts. The data-linking module 48 is further capable of linking the weld list and the element list together.

Figure 5:
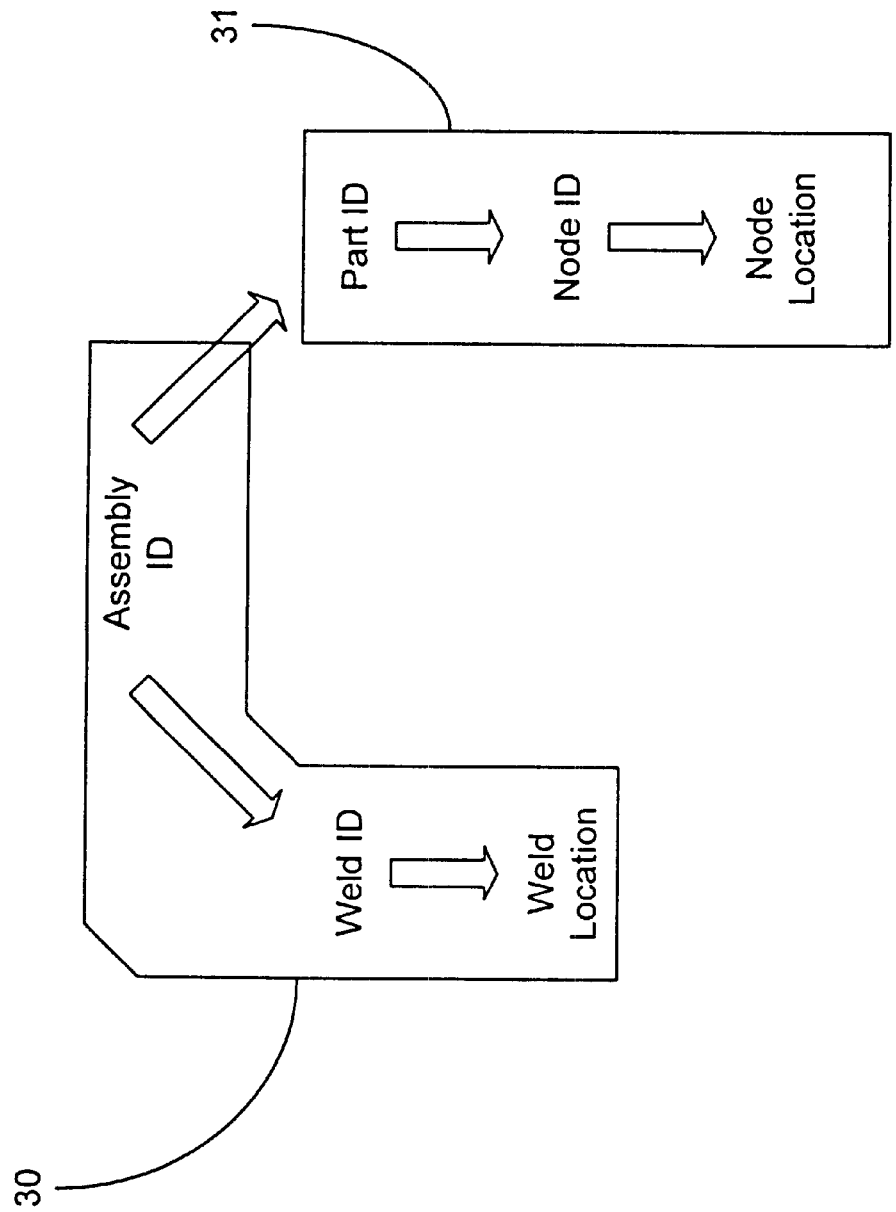
FIG. 5 is a block diagram of a linked list structure in accordance with the present invention.

As shown in FIG. 5, the weld list 30 is itself a collection of linked lists linking assembly identifiers to weld identifiers, and linking weld identifiers to weld locations. Similarly, the element list 31 is a collection of linked lists linking part identifiers to node identifiers, and linking node identifiers to node locations. The data linking module 48 (FIG. 4) therefore extracts the part identifiers from the assembly identifiers contained in the weld data and links these to the elements and nodes found in the FE mesh. The welding module 40 can be implemented within a single executable file. The welding module 40 of the present invention is also able to weld a full vehicle body having 150,000 elements in seven hours as opposed to eighty hours under the conventional approach.

Figure 3:
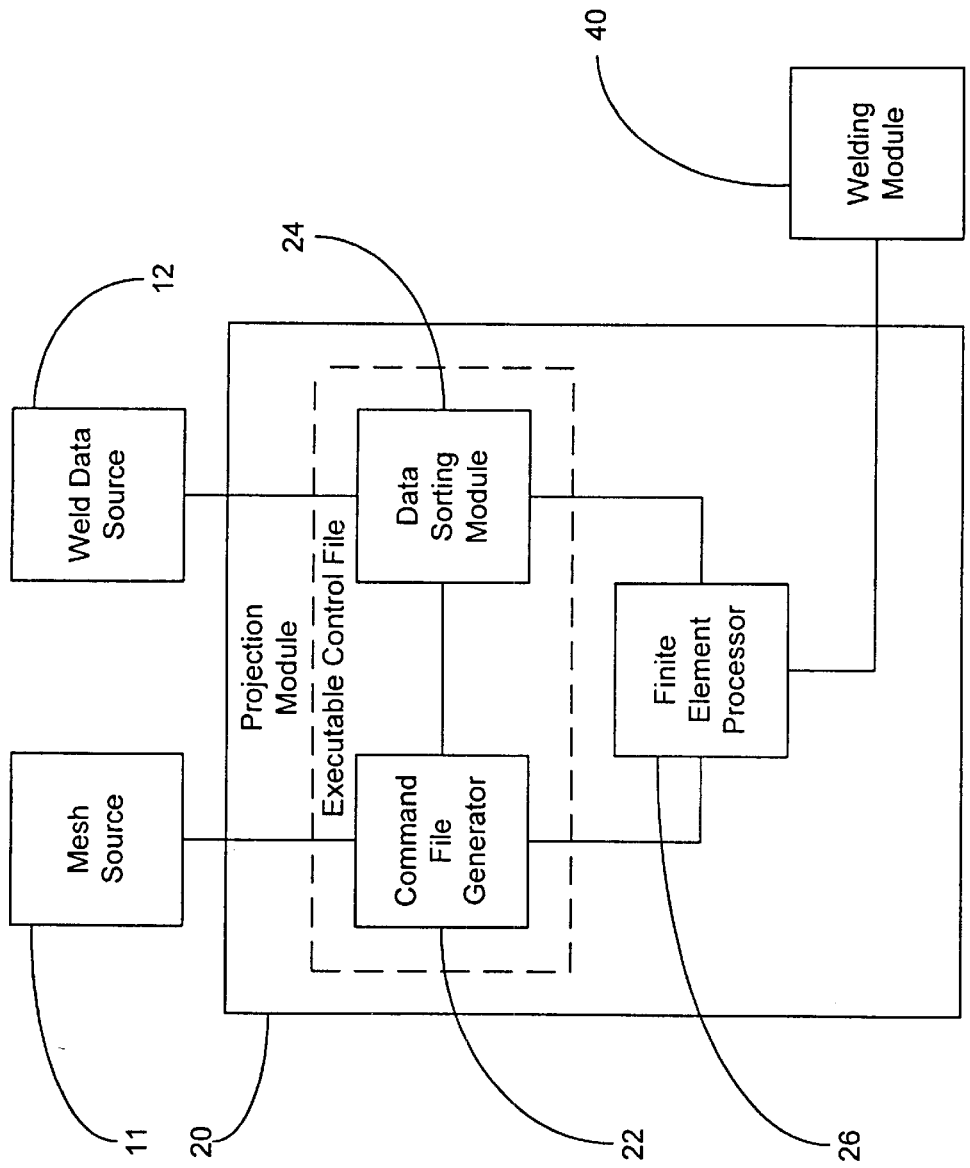
FIG. 3 is a block diagram of a projection module in accordance with the present invention.

FIG. 3 demonstrates a preferred projection module 20. It can be seen that an executable file, which includes a command file generator 22 and a data sorting module 24, in conjunction with an FE processor 26 projects the weld data onto the FE mesh. Specifically, the data-sorting module 24 generates a processor-input file containing the predefined weld locations organized by part, and the command file generator 22 generates a command file. The command file projects the predefined weld locations onto the FE mesh based on the processor input file in response to an execution request from the FE processor 26. The command file is preferably written in the language of the FE processor 26. Thus, the FE processor 26 can generate the execution request to cause the projection. The projection module 20 is able to project 357 predefined weld locations onto a FE mesh in eleven minutes as opposed to fifteen hours under the conventional approach.

In operation, the modeling system 10 provides a computer-based method for generating a welded FE computer model 13 of a vehicle body. With continuing reference to FIGS. 1–6, it can be seen that weld data is retrieved for the vehicle body from a weld-input source. The weld data is automatically projected onto a FE mesh representing surface data for the vehicle body such that a modified FE mesh is generated. The modified FE mesh is automatically welded together with an executable file based on the weld data such that a welded FE computer model 13 is generated. Automatic welding is achieved by identifying the predefined weld locations, and determining a plurality of nearest nodes on the parts to be welded with respect to the predefined weld locations. Traversing the weld list 30, where the weld list includes all the predefined weld locations of the vehicle (about 4000 welds) identifies the predefined weld locations. The plurality of nearest nodes is determined by traversing the element list 31, where the element list includes node locations for the parts. The node locations are then compared to the predefined weld locations to determine which node on the part is nearest to the predefined weld location. Assigned weld elements are generated by connecting the nearest nodes found on the parts to be welded.

It is to be understood that the invention is not limited to the exact construction illustrated and described above, but that various changes and modifications may be made without departing from the spirit and scope of the invention as defined in the following claims.

What is claimed is:

1. A computer-based method for generating a welded finite element model of a vehicle body, the method comprising the steps of:

retrieving weld data for the vehicle body from a weld input source;

automatically projecting the weld data onto a finite element mesh with an executable control file, the finite element mesh representing surface data for the vehicle body such that a modified finite element mesh is generated; and automatically welding the modified finite element based on the weld data such that a welded finite element model is generated.

2. The method of claim 1 wherein the weld data includes predefined weld locations for a plurality of parts assemblies, the method further including the steps of:

identifying the predefined weld locations;

determining a nearest node on each part to be connected with respect to the predefined weld locations; and defining assigned weld elements based on the nearest node locations.

3. The method of claim 2 further including the steps of:

traversing an element list, the element list including node locations for the parts; and comparing the node locations to the predefined weld locations.

4. The method of claim 2 further including the steps of:

selecting an independent node location from the nearest node locations for each parts assembly; and defining the independent node locations as the assigned weld elements.

5. The method of claim 2 further including the step of traversing a weld list, the weld list including the predefined weld locations.

6. The method of claim 1 wherein the surface data includes node locations for parts within the vehicle, the method further including the steps of:

generating a weld list, the weld list including the predefined weld locations;

generating an element list, the element list including the node locations for the parts; and linking the weld list and the element list together.

7. The method of claim 1 further including the step of generating an electronic error file containing error data, the error data based on inconsistencies between the weld data and the modified finite element mesh.

8. The method of claim 7 wherein the error data defines missing parts in the modified finite element mesh.

9. The method of claim 8 wherein the error data further defines dummy node locations for the missing parts.

10. The method of claim 7 wherein the error data defines weld locations falls outside a predefined weld tolerance.

11. An automated method for generating an assigned weld element for an assembly of parts in a computer model of a full vehicle body, the method comprising the steps of:

identifying a predefined weld location for the assembly with an executable control file;

determining nearest nodes on the parts to be welded with respect to the predefined weld location with the executable control file, each part having a nearest node and each nearest node having a nearest node location; and defining one of the nearest node locations as the assigned weld element with the executable file.

12. An automated computer modeling system for generating a welded finite element model of a vehicle body, the modeling system comprising:

a projection module for projecting weld data onto a finite element mesh representing surface data for the vehicle body such that a modified finite element mesh is generated;

a welding module for automatically generating assigned weld elements for the modified finite element mesh;

said assigned weld elements and the modified finite element mesh defining the welded finite element model of the vehicle body.

13. The modeling system of claim 12 further includes an error module for collecting error data from the welding module.

14. The modeling system of claim 13 wherein the error data defines missing parts in the modified finite element mesh.

15. The modeling system of claim 14 wherein the error data further defines dummy node locations for the missing parts.

16. The modeling system of claim 13 wherein the error data defines weld locations falls outside a predefined weld tolerance.

17. The modeling system of claim 12 wherein the weld data includes predefined weld locations for a plurality of parts assemblies, the welding module including:

a weld location selector for identifying the predefined weld locations;

a nearest node module for determining a plurality of nearest nodes with respect to the predefined weld locations; and a weld assignment module for defining the assigned weld elements, where the assigned elements connect the nearest node locations.

18. The modeling system of claim 17 wherein the weld assignment module generates error data.

19. The modeling system of claim 17 wherein the welding module further includes a data linking module for generating a weld list and an element list, the weld list including the predefined weld locations and the element list including node locations for the parts, the data linking module linking the weld list and the element list together.

20. The modeling system of claim 12 wherein the weld data includes predefined weld locations for a plurality of parts assemblies, the projection module including:

a data sorting module for generating a processor input file containing the predefined weld locations organized by part;

a command file generator for generating a command file, the command file projecting the predefined weld locations onto the finite element mesh based on the processor input file in response to an execution request; and a finite element processor for generating the execution request.

* * * * *